United States Patent [19]
Jindra

[11] 3,793,115
[45] Feb. 19, 1974

[54] APPARATUS FOR SHAPING AND WELDING PLASTIC SHEET MATERIAL FOR PACKAGING ARTICLES

[76] Inventor: Theodore H. Jindra, 823 Cedar Cir. Grove, Northfield, Ohio 44067

[22] Filed: Nov. 22, 1971

[21] Appl. No.: 200,907

[52] U.S. Cl.................. 156/381, 156/382, 156/497, 156/499
[51] Int. Cl............................................. B32b 31/04
[58] Field of Search... 156/285, 286, 288, 292, 381, 156/382, 497, 499; 53/285, 366, 373

[56] References Cited
UNITED STATES PATENTS

| | | | |
|---|---|---|---|
| 3,488,244 | 1/1970 | Lepisto | 156/497 |
| 3,250,660 | 5/1966 | Greig et al. | 156/499 |
| 2,730,160 | 1/1956 | Pickering | 156/497 |
| 2,705,523 | 4/1955 | Hasselguist | 156/497 |

*Primary Examiner*—Alfred L. Leavitt
*Assistant Examiner*—Caleb Weston

[57] ABSTRACT

Method and means for forming superposed sheets of thermo-plastic material, as for packaging articles. Superposed sheets are sealed along spaced coextending lines of juncture defining an intermediate area of the material exposed within a closed chamber, and thereby dividing the chamber into inlet and outlet compartments. Heated gaseous medium under pressure within inlet compartment generates void in said intermediate area, initially by penetrating the same, to form severed edge portions which shrink away from each other and form heat-sealed welds contiguous with said spaced lines of juncture. Gaseous medium entering outlet compartment is conducted therefrom in manner to remove all traces of plastic residue from the closed chamber.

5 Claims, 5 Drawing Figures

PATENTED FEB 19 1974 3,793,115

3,793,115

APPARATUS FOR SHAPING AND WELDING PLASTIC SHEET MATERIAL FOR PACKAGING ARTICLES

BACKGROUND OF INVENTION

Heretofore, in the art of sealing monoaxially or biaxially oriented plastic films, such as polyvinyl plastic films, conventional impulse hot-wire sealing machines have been widely employed. Conventional hot-wire sealing methods and means, however, have proved to be unsatisfactory under the best of conditions, primarily because heated wires create thermal decomposition which is evidenced by appearance of brownish particles on the welded seams, and by damaging deposits of material residue on the impulse wires and the supports for the same. This condition required cleaning operations at frequent intervals. Conventional hot wire welding systems, moreover, are known to create gases which have corrosive effects on the equipment, sometimes accompanied by undesirable odors. Hot wire devices of these types referred to also are known to stick to the plastic material, thereby to create broken or weakened areas in the welded seals.

SUMMARY OF INVENTION

In accordance with the present invention, the welding apparatus for performing the improved method to form thermo-plastic sheet material, such as polyvinyl plastic, into hollow containers or bags, may include a chambered matrix having relatively movable, mating sections provided with inwardly opposed inlet and outlet compartments which form a combustion chamber of predetermined shapes and configurations according to the required shapes and configurations of welded joints to be formed in the plastic material. Inwardly presented, chamber-defining wall portions of the mating sections have affixed therein clamping pads of heat-proof material, which, in a closed position of the matrix, grip superposed layers of plastic material in tightly sealed relationship along well-defined edges to form a wall area of the material which initially, in practice of the method, forms a barrier which divides the chamber into separate said inlet and outlet sections or compartments. Hot air or other heated gaseous medium pumped into said inlet compartment is, upon reaching the plastic barrier, effective first to soften and then to rupture the barrier, thereby allowing the gaseous medium to pass rapidly into the outlet compartment from which it is discharged through a suitable conduit means. The superposed sheets, being of material of the type made by known stretch processes, shrinks toward said well-defined edge portions along which the spaced shrunken portions form uniformly welded sealing beads within the matrix chamber. The method may be utilized in this manner to form hollow packages of substantially any shape or size, with or without articles of various shapes and sizes incorporated therein. Upon removal of each welded package from the matrix, the material inwardly of the welded beads may be heat-shrunk about the article in known manner.

A general object of the invention is to provide an improved method and means for producing thermo-plastic packages or containers which eliminate the faults referred to above in connection with hot-wire welding methods.

Other objects of the invention will be manifest from the following brief description and the accompanying drawings.

Figure 1:
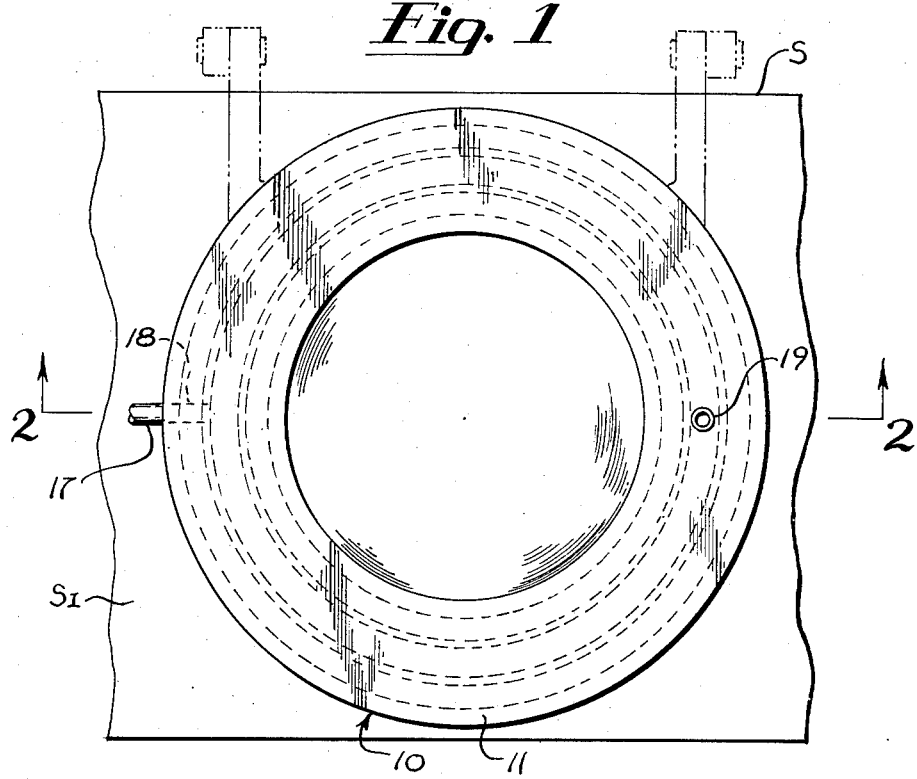
FIG. 1 is a top plan view of a sectional matrix for welding superposed sheets of heat-fusible plastic material into disc-shaped packages, in accordance with the method of the invention.
Figure 2:
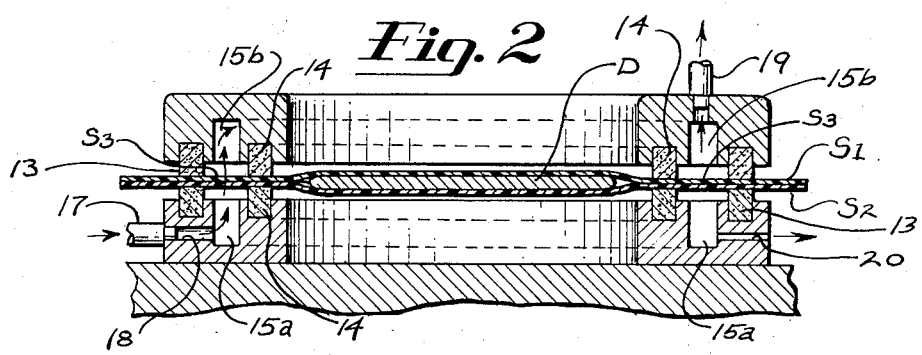
FIG. 2 is an enlarged vertical cross-section, taken substantially on the line 2—2 of FIG. 1, showing superposed layers of the plastic sheet material held between pairs of heat insulated sealing and gripping jaws, and with an article to be packaged contained centrally between the layers.
Figure 4:
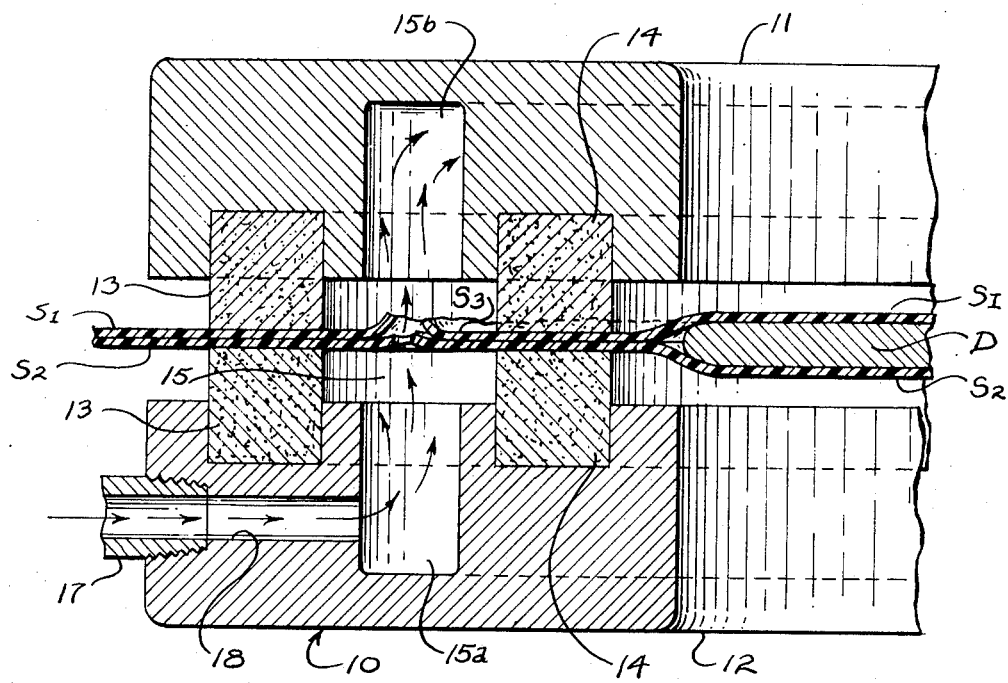
FIGS. 4 and 5 are enlarged cross-sections corresponding to the left-hand portion of FIG. 2, but illustrating progressive steps of heat softening and welding formed edges in the layers within the matrix chamber, and forming beaded edges on the resultantly formed packages.
Figure 5:
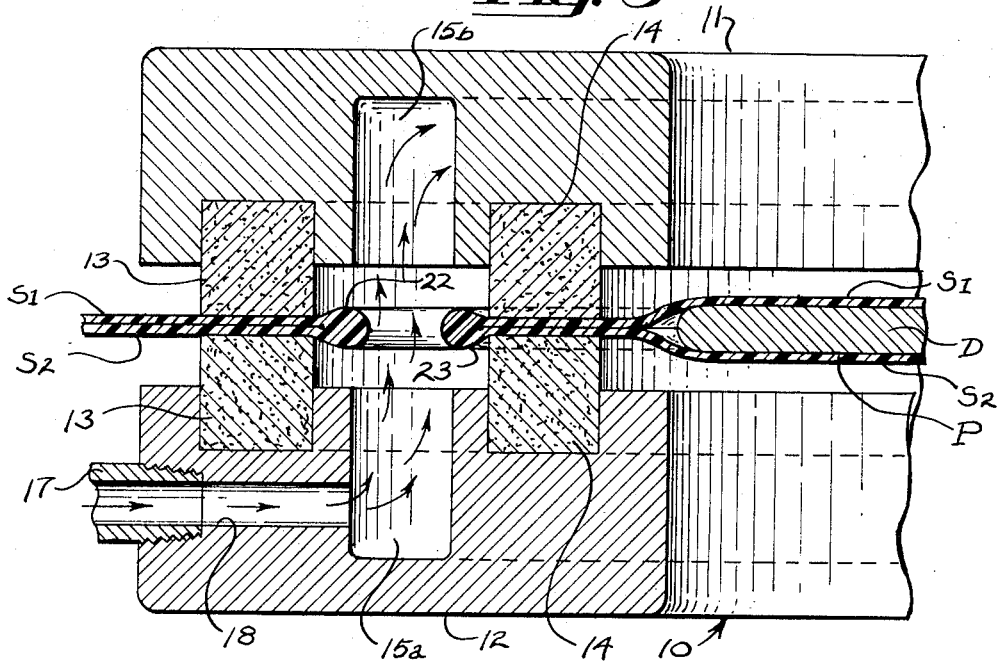

Referring to the drawings generally, and to FIGS. 1 and 2 in particular, there is illustrated a sectional package-forming matrix 10 including mating top and bottom matrix sections 11 and 12 provided with suitable hinged or other means, generally as shown in chain-dotted lines in FIG. 1, for facilitating selective operation of the matrix sections toward and from the closed condition shown in FIGS. 2, 4 and 5. In the structure shown, two concentric pairs of mating ring-shaped clamping jaws 13, 13 and 14,14, for example are affixed to the respective matrix sections, for gripping and sealing two superposed layers of heat fusible plastic film sheets $S_1$ and $S_2$, thereby to expose a circular strip $S_3$ of the layers within a concentric, coextending, welding chamber 15 defined between the respective pairs of jaws 13 and 14, and communicating directly with concentric inlet and outlet chamber compartments $15a$ and $15b$ in the matrix sections 11 and 12. A conduit 17 from a source (not shown) of heated air under pressure, connects with the inlet chamber $15a$ through a passage 18 in the bottom matrix section 12, at a given point on the outer periphery of the same, so that in the FIG. 4 and FIG. 5 conditions the heated air finds passage to the outlet compartment $15b$ to be exhausted through a conduit 19 connecting with the same, at a point diametrically opposite the supply conduit 17 for most effective circulation of the hot air within the chamber compartments. A passage 20 of relatively small flow area as compared with passage 19 may be provided in the lower matrix section 12 at a point diametrically opposite said supply conduit 17 for venting air or gas trapped in the inlet compartment $15a$ in the pre-welding condition best shown in FIG. 2, in which the upper compartment $15b$ is initially sealed off by the fixedly held annular plastic strip $S_3$.

In use of the matrix 10 to practice the method of the invention for packaging a flat disc-like article D, for example, the matrix sections 11 and 12 are clamped together to grip superposed sheets $S_1$ and $S_2$ of heat-fusible synthetic plastic material between the pairs of heat-resistant clamping jaws 13 and 14. In this condition an article D to be packaged will be centrally positioned between the layers $S_1$ and $S_2$, centrally of the inner clamped jaws 14, 14, the concentrically spaced pairs of jaws thereby forming a fluid sealing barrier $S_3$ between the inlet and outlet compartments 15a and 15b.

Next, heated pressurized air, supplied through the conduit 17, upon first entering the inlet compartment 15a forces residual air therefrom, through the relatively small venting aperture 20, and then burns and heats the plastic film strip $S_3$ which is tightly clamped between the pairs of jaws 13 and 14, to the softening range of the plastic sheet material, thereby to rupture the barrier strip $S_3$ of the same and allow the heated air to pass into the outlet compartment and then exhaust through the outlet conduit 19. With continued rapid passage of heated air through the opened-up combustion cavity 15, as indicated by arrows in FIG. 4, the thereby exposedpairs of plastic film edges first absorb additional heat for a thermo-elastic flow range of the material, in which the separated parts of the original strip $S_3$ shrink toward the respective gripping edges of the pairs of jaws 13 and 14, whereby said separated parts acquire increasing gauge or thickness. Additional exposure of the separated parts to heat causes further shrinking of exposed plastic material to cause molecular linkage therein, resulting in the formation of unitary welded beads 22 and 23 upon lowering of the thermo-plastic range of the material.

It is important to note that in practice of the described method, the aforesaid unitary welded beads have been found to be entirely free of discoloration due to the particle decomposition of the type which prevailed in the aforesaid use of hot-wire methods. In any event, any such particles would be quickly carried away with the heated air in its rapid course between the inlet conduit 17 and the outlet conduit 19, as best illustrated in FIGS. 1 and 2.

Upon opening the matrix 10 in known manner, the resultantly formed disc-shaped package P, with an article D contained therein, can be removed for repetition of the process described above.

Figure 3:
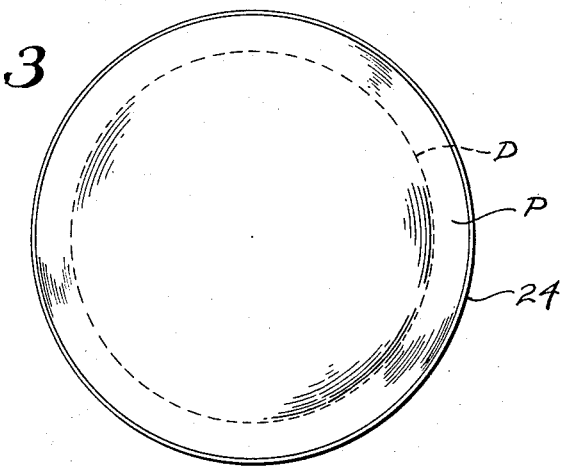
FIG. 3 shows a top plan view of a formed disc-shaped package, with an article contained therein, as produced by the method, in the apparatus shown in FIGS. 1 and 2.

The finished package, upon removal from the matrix 10, and as illustrated in FIG. 3, will have a uniform sealing bead 24 around the periphery thereof which is relatively soft, but very strong, as necessary and desirable in the packaging industry.

Modifications of the invention may be resorted to without departing from the spirit of the invention, or the scope of the appended claims. It will be readily apparent, for example, that the packages produced by the method can be of substantially any shape and size, and that the method and apparatus generally as disclosed can be utilized to form beaded sealing edges on laminations of two or more layers, of various shapes and extents, not limited to closed figures.

What is claimed is:

1. Apparatus for forming superposed layers of thermo-plastic sheet material to have joined edges of given configurations, comprising: a matrix having relatively movable mating parts provided with spaced pairs of clamping means for defining a closed cavity of given extent and configuration, in a closed condition of said mating parts for said spaced pairs of clamping means in said closed condition of said mating parts being adapted to grip the superposed layers to be sealed along spaced lines of joinder thereof coextensive with said given configuration, whereby the gripped material initially divides said cavity into separate coextending compartments; inlet passage means in one said matrix section communicating with the cavity compartment thereof, and outlet passage means in the other said matrix section communicating with the cavity compartment of the same; and means for connecting said inlet passage with a supply of heated gaseous medium adapted, upon contact with said gripped thermo-plastic sheet material, to generate a void therein to expose joined edges adjacent said spaced lines and to fuse and seal the thereby exposed joined edges of superposed layers together.

2. Apparatus as in claim 1, wherein said clamping means includes spaced pairs of heat-resistant jaws.

3. Apparatus as in claim 2, wherein gripping edges on one said pair of heat resistant gripping jaws have configuration adapted for welding sealed peripheral edge portions of a plastic container formed in said superposed layers of the sheet material.

4. Apparatus as in claim 3, wherein said matrix has by-pass means of lesser flow area than that of said inlet passage, adapted to discharge ambient air from said inlet compartment upon initial entry of the heated gaseous medium toward welding contact with thermoplastic sheet material held between said pairs of gripping jaws.

5. Apparatus as in claim 1, wherein said matrix is provided with by-pass means of lesser flow capacity than that of said inlet passage, adapted to discharge ambient gaseous medium from said inlet compartment upon initial entry of heated gaseous medium into the same.

* * * * *